L. S. MILLS.
Heating Gravel and Pitch.
No. 63,286.             Patented March 26, 1867.
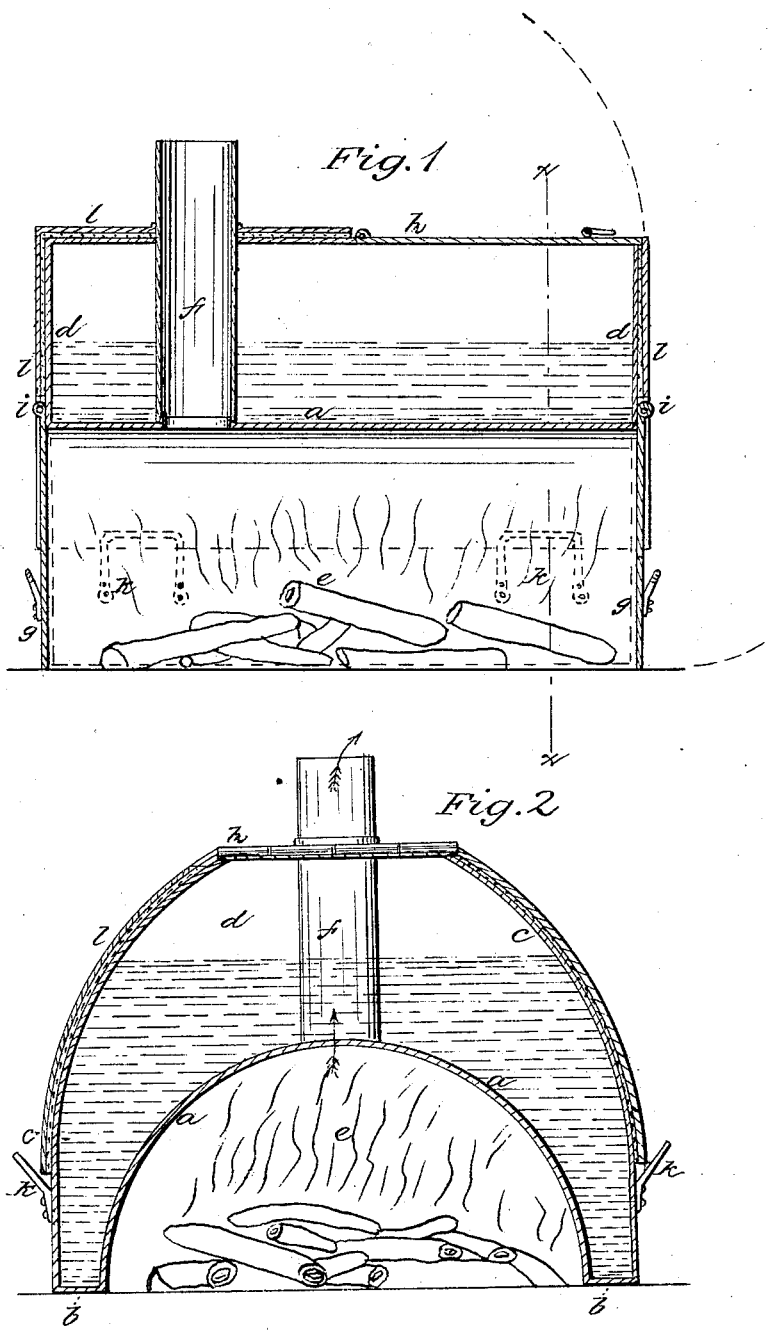

United States Patent Office.

LUKE S. MILLS, OF BROOKLYN, NEW YORK.

*Letters Patent No. 63,286, dated March 26, 1867.*

---

PORTABLE BOILERS FOR PITCH, &c.

---

*The Schedule referred to in these Letters Patent and making part of the same.*

---

TO ALL WHOM IT MAY CONCERN:

Be it known that I, LUKE S. MILLS, of Brooklyn, in the county of Kings, and State of New York, have invented, made, and applied to use a certain new and useful improvement in Boilers for Heating Pitch or other substances; and I do hereby declare the following to be a full, clear, and exact description of the said invention, reference being had to the annexed drawing, making part of this specification, wherein—

Figure 1 is a longitudinal section of said boiler; and

Figure 2 is a cross-section of the same at the line $x\ x$.

Similar marks of reference denote the same parts.

In heating pitch, asphaltum, and similar substances for roofing purposes, or for coating vessels, &c., there is generally a very disagreeable smoke and smell, arising from two causes: the wood employed to heat the kettle is not properly burnt, and the kettle is open, causing the more volatile portions to pass off; besides this the surface of the pitch is large, it becomes chilled by the air, and the bottom of the kettle is exposed to so much heat that the material becomes charred and burns on and prevents the heat conducting to the liquid mass, thus involving a loss of fire and burning the kettle out very quickly. In the old character of pitch-kettles there is danger of the material catching fire and boiling over. In this manner much valuable property has been set on fire.

The nature of my said invention consists in a portable boiler formed with hollow sides descending around the fire space, and with the outer portion of the boiler contracted towards a movable cover, so that surface evaporation will be checked, a large extent of fire-heating surface will be obtained, and the formation of coke is prevented, because coke only will form at the bottom of the kettle by the deposit and accumulation of "dross" or charred particles, and these pass down to a portion of the boiler at the bottom of the hollow sides, where there is not sufficient heat to cause their adhesion to the boiler, and they can be easily cleaned out.

In the drawing, $a$ represents the inner or fire surface of the boiler formed as an arch, united at its lower edges by the plates $b$ to the upper and outer case $c$ of the boiler, formed also as an arch, or contracted to diminish the surface of the material in the boiler. The heads $d$ are crescent-shaped. This form of boiler leaves a fire-chamber, $e$, beneath the arch $a$, and from this a pipe, $f$, passes through the boiler to convey away the products of combustion. Doors, $g$, hinged at $i$, may be provided at each end to enclose the fire, and handles $k\ k$ give facility for easily transporting the boiler. In the top of the casing $c$, an opening is left for the introduction or withdrawal of the material to be heated, and a movable or hinged cover, $h$, is provided to keep in the vapors. I put over the casing $c$, and ends or heads $d$, a jacket of felt or similar non-conducting material, and protect that by a cover, $l$, of sheet metal. A boiler made in this manner has a large extent of heating surface, it is light, and is ready for immediate use when placed on the earth or a pavement. This boiler is adapted to heating any substances for domestic or agricultural purposes, but it is particularly useful for pitch, asphaltum, and similar resinous materials or compounds that require a high degree of heat, in consequence of the advantageous features before mentioned. The under side of the boiler may be made elliptical or prismatic instead of an arc of a cylinder. And, if desired, one end of the fire-chamber may be closed by a hollow case containing the material to be heated, the same as the sides of the chamber, instead of making use of a second door, $g$, as shown.

What I claim, and desire to secure by Letters Patent, is—

1. A portable boiler formed with an arched fire-chamber, and an exterior shell contracted towards the top, as and for the purposes specified.

2. I claim a portable boiler formed with hollow sides to set down upon the earth or pavement, an arched fire-chamber provided with doors at the ends, a smoke pipe or flue passing off from the top of the fire-chamber through the boiler, and a movable cover to give access to the contents of the boiler, substantially as set forth.

3. In combination with a portable boiler formed as aforesaid, I claim the jacket of felt, and cover $l$, as set forth.

Dated this fifteenth day of January, A. D. 1867.

LUKE S. MILLS.

Witnesses:
CHAS. H. SMITH,
GEO. D. WALKER.